US012326032B2

(12) United States Patent
Lamb et al.

(10) Patent No.: US 12,326,032 B2
(45) **Date of Patent: *Jun. 10, 2025**

(54) METHOD AND APPARATUS FOR CONTROLLING A MOVABLE BARRIER SYSTEM

(71) Applicant: Universal Electronics Inc., Scottsdale, AZ (US)

(72) Inventors: Michael Lamb, Rancho Santa Fe, CA (US); Michael Bailey, Carlsbad, CA (US); Jay Stone, San Marcos, CA (US); Carlo Petrucci, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,569

(22) Filed: Oct. 11, 2023

(65) Prior Publication Data

US 2024/0044200 A1 Feb. 8, 2024

Related U.S. Application Data

(62) Division of application No. 13/941,519, filed on Jul. 14, 2013, now Pat. No. 11,795,754.

(51) Int. Cl.
*E05F 15/77* (2015.01)
*E05F 15/79* (2015.01)

(52) U.S. Cl.
CPC .............. *E05F 15/77* (2015.01); *E05F 15/79* (2015.01)

(58) Field of Classification Search
CPC . E05F 15/77; E05F 15/79; E05F 15/20; E05F 15/006; E05F 15/0004; E05F 15/0021; E05F 15/0073; E05F 15/2023; E05F 15/2038; G06F 17/00
See application file for complete search history.

(56) References Cited

U.S. PATENT DOCUMENTS 6,392,537 B1 5/2002 Tazumi
6,563,431 B1 5/2003 Miller, Jr.
7,038,409 B1 * 5/2006 Mullet .................. E05F 15/668 340/461

(Continued)

OTHER PUBLICATIONS

Final Office Action in U.S. Appl. No. 14/101,533, dated Jul. 29, 2014, 10 pp.

(Continued)

*Primary Examiner* — Adnan Aziz
(74) *Attorney, Agent, or Firm* — Greenberg Traurig, LLP

(57) ABSTRACT

In one embodiment, a method conducted by a movable barrier gateway device is disclosed for controlling a movable barrier, comprising receiving, by a communication interface, a remote command from a remote control device to move the movable barrier, the remote command sent over a network, delaying transmission of a signal to a movable barrier controller to move the movable barrier, by a processor, for a predetermined time period after the remote command is received, detecting movement of the movable barrier within the predetermined time period by a barrier movement detector, and ignoring the remote command by the processor in response to detecting movement of the movable barrier within the predetermined time period.

16 Claims, 3 Drawing Sheets

(56) References Cited

U.S. PATENT DOCUMENTS

| | | | | |
|---|---|---|---|---|
| 7,509,991 | B2 | 3/2009 | Weik, III | |
| 7,778,604 | B2 | 8/2010 | Bauman | |
| 8,587,404 | B2 | 11/2013 | Laird | |
| 8,839,557 | B2 | 9/2014 | Sheldon | |
| 2003/0204996 | A1 * | 11/2003 | Gillett | E06B 7/32 49/362 |
| 2005/0176400 | A1 | 8/2005 | Mullet | |
| 2006/0238316 | A1 | 10/2006 | Taki | |
| 2010/0242369 | A1 | 9/2010 | Laird | |
| 2010/0257784 | A1 | 10/2010 | Fitzgibbon | |
| 2010/0289661 | A1 | 11/2010 | Styers | |
| 2013/0081329 | A1 | 4/2013 | French | |
| 2013/0326595 | A1 | 12/2013 | Myers | |
| 2014/0190082 | A1 | 7/2014 | Sheldon | |
| 2015/0275564 | A1 * | 10/2015 | Rosenthal | H04W 4/80 700/275 |

OTHER PUBLICATIONS

Non-Final Office Action in U.S. Appl. No. 14/101,533, dated Mar. 12, 2014, 12 pp.

Underwriters Laboratories, Inc., UL 325, Standard for Door, Drapery, Gate, Louver, and Window Operators and Systems, Safety Standard, Oct. 13, 2011, pp. 60B and 61, 5th Edition, Underwriters Laboratories, Inc., US.

* cited by examiner

METHOD AND APPARATUS FOR CONTROLLING A MOVABLE BARRIER SYSTEM

CROSS-REFERENCE TO RELATED APPLICATIONS

This application is a divisional of U.S. patent application Ser. No. 13/941,519 filed on Jul. 14, 2013.

BACKGROUND

Field of Use

The present application relates to movable barriers and their control systems. More specifically, the present application relates to a method and apparatus for controlling operating of movable barriers that are capable of being controlled by a remote command.

Description of the Related Art

Systems for operating and controlling various types of barriers such as garage doors, swing gates, sliding gates, and the like are well known. To increase security, movable barrier systems have been developed that include an auto close feature such that barriers that remain open for a given amount of time without user input are automatically closed. Such systems may also include an imminent moving notification system from providing an alert both prior to and during the door's closing so that people may avoid the closing door. Timer-to-close with imminent moving notification has been in operators for years.

In addition to the possibility of the auto-close feature, the movable barrier systems may be configured to be operated by a user from a distance or a location that is remote from the barrier. This ability to remotely control operation of movable barrier systems may be built into newer movable barrier controllers, or it may be added on to existing movable barrier controllers lacking such a feature. For example, an add-on device called the NiOGarage kit from iOTOS connects to existing garage door openers to allow users the ability to control garage door openers remotely using a cell phone. Such add-on kits are located near existing garage door motor controllers and typically receive commands to move garage doors via wireless local area networks. The device is connected to input terminals on the existing garage door motor controller to provide a signal to the garage door motor controller to move the garage door when a signal is received from a remote device, such as a cell phone.

In a remote operation scenario, users may not know whether people, animals, or other objects are in the vicinity of a barrier actuated to move by the remote user. For example, a movable barrier system may be configured to be operated via a security system that a user can access via a centralized control, the Internet, or a conventional mobile communication device. In such systems, the user may be able to close a barrier without having any information regarding people that may be located next to the barrier. In such circumstances, it is advantageous to include an imminent barrier movement notification feature to warn those near the barrier of the barrier's imminent movement when actuated to move by a user that is not present at the barrier.

Such imminent movement notification typically includes a time period in which barrier motion is delayed, in addition to light provision, sound provision, or partial movement of the barrier as a notification of imminent barrier movement.

However, during this time period, the movable barrier controller may receive a local command to move the movable barrier. Thus, a conflict may arise due to the presence of two commands to operate the movable barrier; one originating locally and one originating remotely. For example, if a movable barrier is in an open position and a remote command is received by the add-on device to operate the barrier, the device may wait a predetermined time period to send a signal to the garage door controller to close the door. During this time period, the device may warn of an imminent movement by emitting a warning sound and illuminating a light. However, if a local command is received by the garage door controller during this predetermined time period to close the door, the garage door controller may begin to close the door and then, at the end of the predetermined time period, reverse movement of the movable barrier as a result of subsequently receiving the signal from the add-on device to move the door.

Therefore, it may be desirable to avoid this potential conflict in movable barrier systems that allow both remote and local operation of movable barriers.

SUMMARY

The embodiments described herein relate to a method and apparatus for controlling a movable barrier. In one embodiment, a method conducted by a movable barrier gateway device is disclosed for controlling a movable barrier, comprising receiving, by a communication interface, a remote command from a remote control device to move the movable barrier, the remote command sent over a network, delaying transmission of a signal to a movable barrier controller to move the movable barrier, by a processor, for a predetermined time period after the remote command is received, detecting movement of the movable barrier within the predetermined time period by a barrier movement detector, and ignoring the remote command by the processor in response to detecting movement of the movable barrier within the predetermined time period.

In another embodiment, a device used in conjunction with an existing garage door controller and a garage door is disclosed to control operation of the garage door, comprising, a communication interface for receiving a remote command, from a remote control device located remotely from the garage door controller, to move the garage door, a signal output connection coupled to an input of the garage door controller, the signal output for providing one or more signals to the garage door controller to move the garage door, means for detecting movement of the garage door, a memory for storing processor-executable instructions, and a processor coupled to the communication interface, the means for detecting movement of the garage door, the signal output, and the memory, for executing the processor-executable instructions that cause the device to delay transmission of a signal to a movable barrier controller to move the movable barrier for a predetermined time period after the remote command is received, detect movement of the movable barrier within the predetermined time period, and ignore the remote command in response to detecting movement of the movable barrier within the predetermined time period.

In yet another embodiment, a non-transitory processor-readable media having processor-executable instructions stored thereon is disclosed, for execution by a processor to perform a method comprising receiving a remote command from a remote control device to move the movable barrier, delaying transmission of a signal to a movable barrier controller to move the movable barrier for a predetermined time period after the remote command is received, detecting movement of the movable barrier within the predetermined time period, and ignoring the remote command by the processor in response to detecting movement of the movable barrier within the predetermined time period.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present description relates to methods and apparatus for operating movable barriers, such as garage doors, swing gates, sliding gates, or other types of doors, windows, gates, and the like. The ideas presented herein are particularly useful in conjunction with existing movable barrier systems lacking remote operation capabilities.

Figure 1:
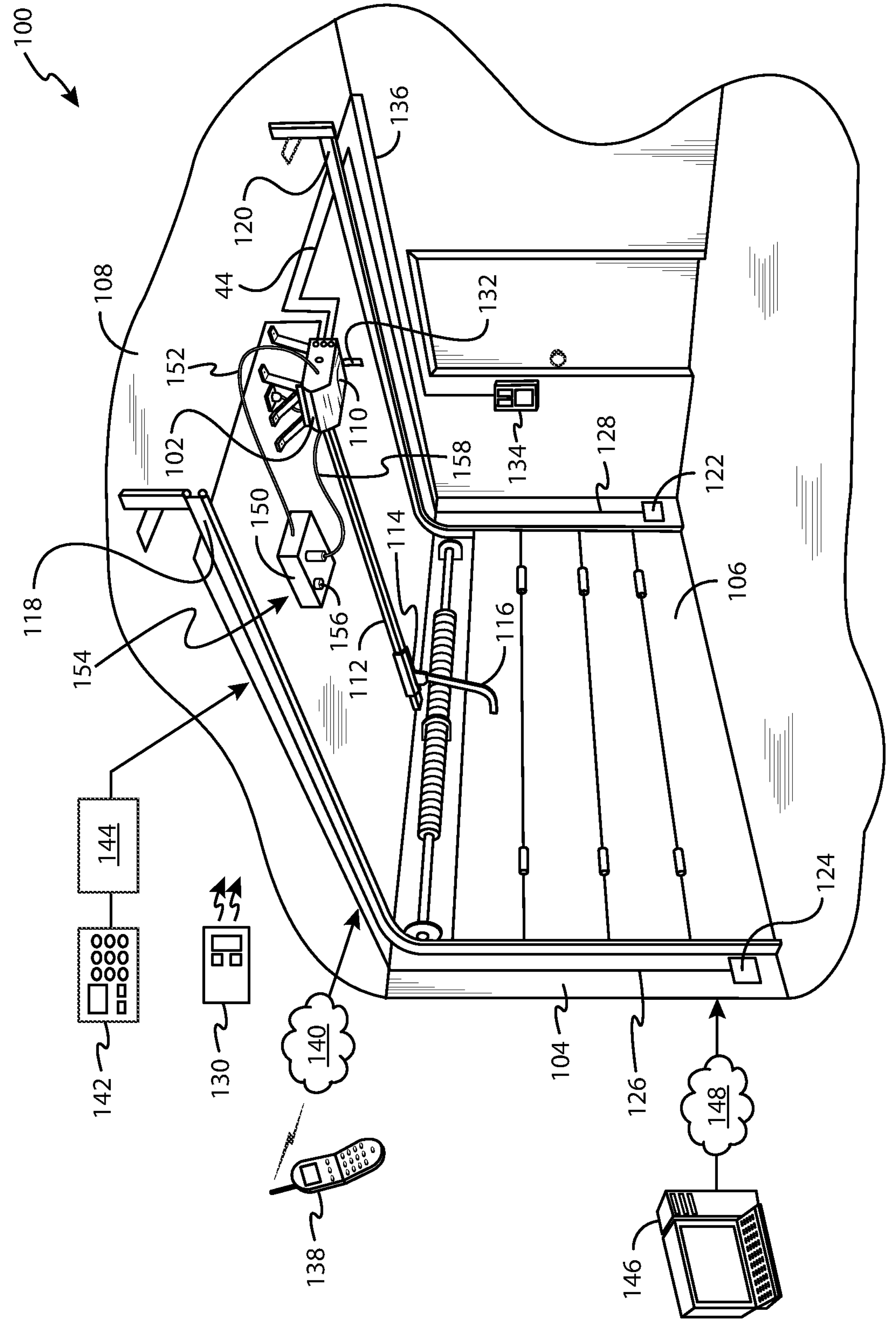
FIG. 1 is an illustration of a movable barrier system for controlling movement of a movable barrier, in this case a garage door.

FIG. 1 is an illustration of a movable barrier system 100, comprising a movable barrier controller 102, here a garage door opener head unit, mounted within a garage 104 and employed for controlling the opening and closing of the movable barrier 106, here a garage door. The movable barrier controller 102 is mounted to the ceiling 108 of the garage 104. The movable barrier controller 102 includes a motor and processing circuitry for providing electrical power to the motor upon receipt of certain commands. The controller responds to various inputs by starting and stopping the motor, which is used to move the barrier, and by turning a light 110 on and off. Extending from the movable barrier controller 102 is a rail 112 having a releasable trolley 114 attached thereto and arm 116 extending from the trolley 114 to the multiple-paneled garage door 106 positioned for movement along a pair of door rails 118 and 120. The movable barrier controller 102 transfers the garage door 106 between open and closed positions for allowing access to and from the garage 104.

For safety purposes, an optical emitter 122 and optical detector 124 are provided. These may be coupled to the movable barrier controller 102 by a pair of wires 126 and 128. The emitter 122 and detector 124 are used to provide safety of operation in barrier movement. To provide such safety of operation, the controller responds to the emitter 122 and detector 124 and will reverse and open the door if an obstruction is sensed in the doorway.

At least one local transmitter unit 130 is adapted to send wireless signals to an antenna 132 positioned in, on, or extending from the movable barrier controller 102. The antenna 132 is coupled to a receiver located within the movable barrier controller 102. The local transmitter unit 130 typically transmits low-power RF signals that are effective within a limited geographical area from movable barrier controller 102. A wall mounted wall switch 134, which may include any number of switches as required for a given system, is mounted on a wall of the garage 104. The wall switch 134 communicates with the movable barrier controller 102 through a direct physical wired connection 136 to the movable barrier controller 102 using any commonly known method of communication, including serial bus communication. The local transmitter unit 130 and wall switch 134 are herein designated “local control devices” because they typically in visual range of the garage door 106 as they are used.

The signals emanating from local transmitter unit 130 may comprise one or more of a code format, a rolling code, a signal frequency, and/or a signal modulation. With respect to code formats, for example, fixed code or rolling code formats with and without encryption as known in the art, codes may be sent in a number of formats from local transmitter unit 130 and movable barrier controller 102. The signals, such as radio frequency or other wireless transmission carriers may be sent between local transmitter unit 130 and movable barrier controller 102 according to a variety of frequencies or modulations. Signals may also be modulated in a number of different ways; thus, the local transmitter unit 130 may be configured to communicate with the movable barrier controller 102 via a variety of signal modulation techniques.

A movable barrier gateway device 150 may be incorporated into the movable barrier system 100 in order to allow remote control capability, e.g., to allow users to remotely open and close the garage door 106 when not in visual contact with the garage door 106. The movable barrier gateway device 150 is typically located in proximity to the movable barrier controller 102 as shown. In one embodiment, the movable barrier gateway device 150 comprises male AC prongs that plug into an existing AC electrical supply socket (not shown) and a female AC socket for supplying power to the movable barrier controller 102 via power cord 158. The movable barrier gateway device 150 is further coupled to the movable barrier controller 102 via signal cable 152. The signal cable 152 provides commands to move the garage door 106 from the movable barrier gateway device 150 into input terminals located on the movable barrier controller 102. The terminals on the movable barrier controller 102 are for local, wired control of the garage door 106, such as the terminals used by wall switch 132. Cable 152 may be wired in parallel with direct physical wired connection 136 so that either movable barrier gateway device 150 or wall switch 134 may control operation of garage door 106. In this configuration, the movable barrier gateway device 150 receives remote commands to move the garage door from remote control devices over a wireless communication network 140 or wireless local area network 154, and then provides signals to the movable barrier controller 102 to move the garage door. The local area network 154 typically comprises a Wi-Fi-based network located in a home nearby garage 104 or directly inside garage 104.

A variety of devices may be used to remotely control operation of the movable barrier 106 by users who are remotely located from the movable barrier system 100, via the movable barrier gateway device 150. For example, a remote control device in the form of mobile communication device 138 may be configured to send signals through a wireless communication network 140 to the movable barrier gateway device 150. Mobile communication devices 138 such as mobile phones and other mobile devices are well-known. The term “remote control device” as used herein denotes a device other than transmitter 130 and wall switch 134 that is capable of operating the movable barrier system 100 via communication with the movable barrier gateway device 150. Typically, a remote control device is not in close proximity to garage 104, even though it may be located nearby, such as in a house adjacent to garage 104 or if it is a mobile device and is used to open or close the garage door 106 while in proximity to the garage door 106.

Another example of a remote control device comprises a security system interface 142 configured to send signals via a security system 144 and/or local area network 154, such as a home security system or other building security system, to the movable barrier gateway device 150, either by wired or wireless means, to control operation of the movable barrier controller 102. Such communication paths between security systems and mobile barrier operators are readily configurable by one skilled in the art.

Yet another example of a remote control device comprises a networked communication device 146, such as a computer, tablet or similar device that communicates through a network 148, such as the Internet and/or through local area network 154, to the movable barrier gateway device 150 to control operation of the movable barrier controller 102. Other communication paths and devices are possible.

An additional security/convenience feature of the movable barrier system 100 is the provision of an overhead light 110 (also sometimes referred to as a workspace light). The movable barrier controller 102 may include overhead light 110 for illuminating the interior of the garage 104 in which the movable barrier controller 102 is located. The light 110 is activated or deactivated typically either by pressing the appropriate switch on the wall mounted switch 134, by breaking an optical beam that runs between the optical emitter 122 and the optical detector 122, or by sending a command from a remote control device, such as mobile communication device 138, networked communication device 146, and security system interface 142.

In one embodiment, movable barrier gateway device 150 comprises a moving-barrier imminent motion alert. In this embodiment, the movable barrier gateway device 150 is configured to generate the moving-barrier imminent motion alert upon receipt of a command from a remote control device (e.g. mobile communication device 138, networked communication device 146, security system interface 142, etc.) and to provide a signal to movable barrier controller 102 to move the movable barrier 106 after a predetermined time period has elapsed from receipt of such remote command, the predetermined time period typically on the order of five seconds or so. The moving-barrier imminent motion alert may comprise a number of techniques to notify people in the vicinity of movable barrier system 100 to indicate that the movable barrier 106 is about to move and/or is in the process of moving. The moving-barrier imminent motion alert may include, for example, flashing of a light 156 located on movable barrier gateway device 150 and/or light 110 on movable barrier controller 102, starting and stopping of movement of the door 106 via signals from movable barrier gateway device 150 to movable barrier controller 102, an audible alert from a sound emitter within/on movable barrier gateway device 150 and/or movable barrier controller 102 (not shown), a combination of the above, or any other method known in the art. The moving-barrier imminent motion alert is not generated by movable barrier gateway device 150 upon receipt of a local command to move the garage door 106 by the movable barrier controller 102, e.g., a command from transmitter 130, wall switch 134 or optical detector 124.

Figure 2:
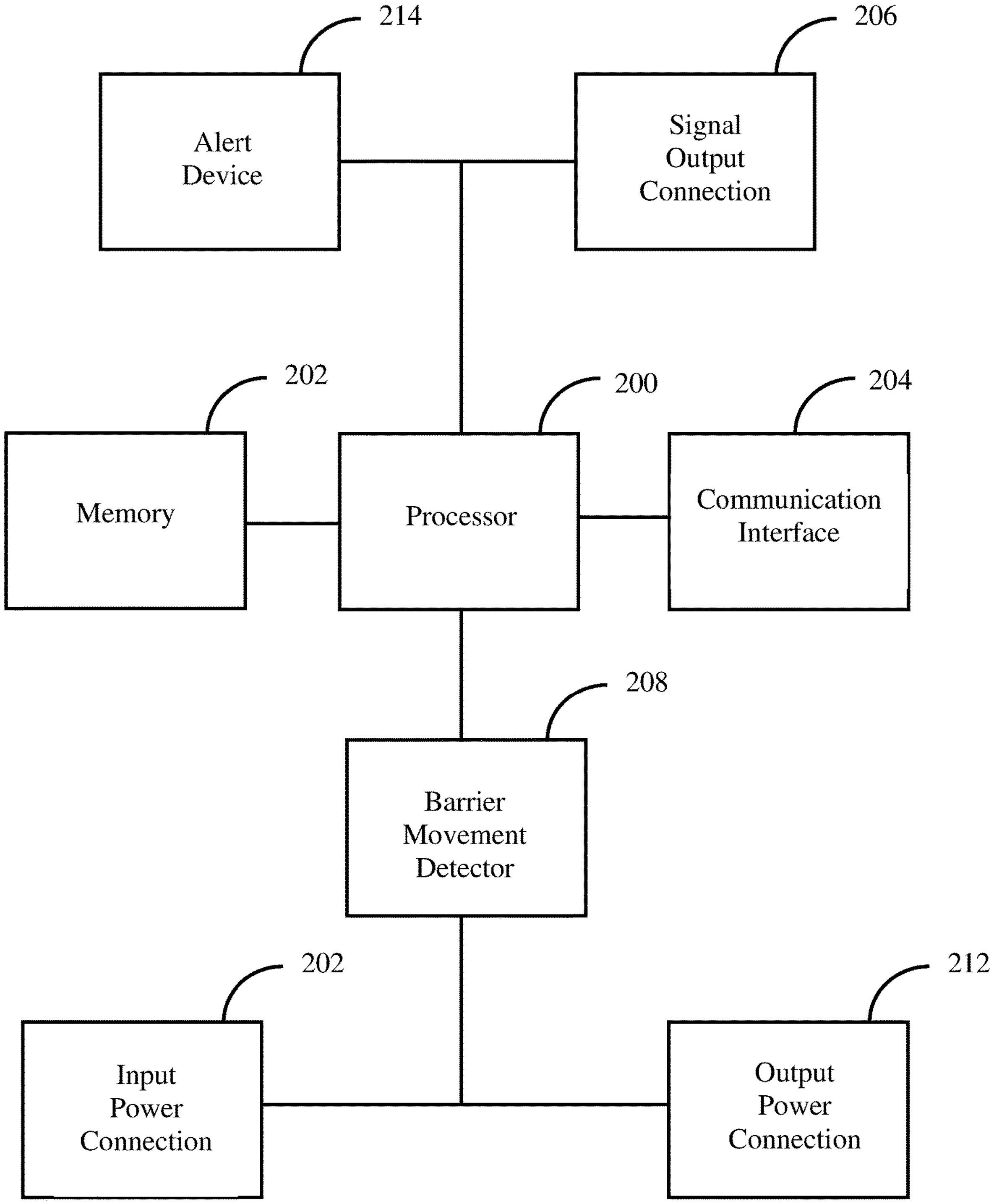
FIG. 2 is a functional block diagram of one embodiment of a movable barrier gateway device shown in FIG. 1.

FIG. 2 is a functional block diagram of one embodiment of the movable barrier gateway device 150. Specifically, FIG. 2 shows processor 200, memory 202, communication interface 204, signal output connection 206, barrier movement detector 208, input power connector 210, output power connector 212, and alert device 214. It should be understood that not all of the functional blocks shown in FIG. 2 are required for operation of barrier gateway device 150 in all embodiments, that the functional blocks may be connected to one another in a variety of ways, and that not all functional blocks necessary for operation of the movable barrier gateway device 150 are shown for purposes of clarity.

Processor 200 is configured to provide general operation of barrier gateway device 150 by executing processor-executable instructions stored in memory 202, for example, executable code. Processor 200 typically comprises a general purpose processor, such as an ADuC7024 analog microcontroller manufactured by Analog Devices, Inc. of Norwood Massachusetts, although any one of a variety of microprocessors, microcomputers, and/or microcontrollers may be used alternatively.

Memory 202 comprises one or more information storage devices, such as RAM, ROM, EEPROM, UVPROM, flash memory, CD, DVD, Memory Stick, SD memory, XD memory, thumb drive, or virtually any other type of electronic, optical, or mechanical memory device. Memory 202 is used to store the processor-executable instructions for operation of barrier gateway device 150 as well as any information used by processor 200, such as a predetermined barrier movement delay time period used to determine a time delay between receipt of a command to move the garage door 106 via communication interface 204 and issuing a signal to movable barrier controller 102 to move the garage door 106.

Communication interface 204 is electronically coupled to processor 200 and comprises receiver circuitry and/or software/firmware configured to receive modulated information sent by remote control devices, typically from local area network 154 or wireless communication network 140. In another embodiment, communication interface 204 further comprises transmitter circuitry and/or software/firmware configured to transmit information. In one embodiment, the information received by communication interface 204 comprises commands to move the garage door 106. In another embodiment, the information received comprises a first command to open garage door 106 and a second command to close garage door 106. In yet another embodiment, alternative or in addition to the foregoing, the information comprises status information sent by transmitter circuitry pertaining to a condition of the movable barrier system 100, for example, a status as to whether the garage door 106 is open, closed, partially open, partially closed, and/or whether a command send from a remote control device was successful in operation or not. The received/transmitted information may be provided to processor 200 and/or stored in memory 202, while information transmitted from communication interface 204 is provided by processor 200. The receiver circuitry comprises circuitry well-known in the art for downconverting and demodulating received RF signals. In one embodiment, the circuitry comprises Wi-Fi receiver circuitry and associated firmware. In another embodiment, the circuitry is configured to receive signals in accordance with the well-known Z-Wave® protocol. In an embodiment where communication interface 204 additionally comprises transmission circuitry, such circuitry is well known in the art.

Signal output connection 206 comprises one or more physical terminals, connectors, ports, or other interfaces that allow electronic signals to be sent to movable barrier controller 102, typically via signal cable 152. In another embodiment, signal output connection 206, additionally or alternatively, comprises circuitry to wirelessly transmit signals to movable barrier controller 102. For example, the circuitry to wirelessly transmit comprises similar circuitry that is used in local transmitter unit 130 to transmit signals wirelessly to movable barrier controller 102, such as a rolling code generator and RF transmitter at a frequency compatible with movable barrier controller 102.

Barrier movement detector 208 comprises a device and/or circuitry that detects whether the garage door 106 has moved as a result of a local command, such as a command transmitted by a local control device such as local transmitter unit 130, wall switch 134, or optical detector 124. If such detection occurs during a predetermined barrier movement delay time period after a remote command to move the garage door 106 is received by the movable barrier gateway device 150, the remote command is canceled, or ignored, by processor 200. In other words, the movable barrier gateway device 150 does not generate and provide a signal to the movable barrier controller 102 to move the garage door 106.

In one embodiment, the barrier movement detector 208 comprises an accelerometer, such as the MMA7361L 3-Axis Accelerometer manufactured by Freescale Semiconductor of Austin, Texas. The accelerometer may be located within or on barrier gateway device 150, mounted to movable barrier controller 102, or virtually anywhere within the vicinity of barrier movement controller 102, such as on ceiling 108. The accelerometer may be connected by wired or wireless means to barrier gateway device 150 so that signals generated by the accelerometer can be provided to processor 200 for processing. In any case, the accelerometer detects movement of the garage door 106 by sensing vibration of the motor that is used to move the garage door via rail 112 and releasable trolley 114. When the motor is energized to either open or close the garage door 106, a vibration is typically produced by the motor that can be detected by the accelerometer. In the case where the accelerometer is mounted to the movable barrier controller 102, the vibration is directly sensed through the movable barrier controller 102 housing, as the motor is typically located within the movable barrier controller 102. In the case where the accelerometer is located on or within barrier gateway device 150, vibration from the motor is typically transmitted from the motor, through movable barrier controller 102 housing/mounts and through connecting materials, such as the garage ceiling 108, to barrier gateway device 150, where the vibration is strong enough to be detected by the accelerometer.

In another embodiment, the barrier movement detector 208 comprises a gyroscope that is used either in addition, or alternatively, to the accelerometer, such as the GWS PG-03 gyroscope found on many hobby websites. The gyroscope may also be mounted on/to barrier gateway device 150, movable barrier controller 102, or another location proximate to movable barrier controller 102 and is used to sense vibrations from the motor when the motor is energized to move the garage door 106 after receipt of a command from a local control device.

In yet another embodiment, the barrier movement detector 208 comprises current sensing mechanism/circuitry used to detect an increase in current draw by the motor as the motor begins moving the garage door 106. In this embodiment, barrier gateway device 150 may comprise an input power connector 210 typically in the form of a two or three prong male AC connector and an output power connector 212, typically in the form of a two or three prong female AC connector. One or both connectors may be located directly on/in a housing of barrier gateway device 150, enabling barrier gateway device 150 to plug directly into, for example, an existing AC socket in ceiling 108, while a power cord 158 from movable barrier controller 102 may be plugged into the output connector 112 found on barrier gateway device 150. The input power connector 210 is electrically connected to the output power connector 212 so that AC current from the input power connector 210 flows through barrier gateway device 150 and out via output connector 212, to movable barrier controller 102. In this way, power is provided both to the movable barrier gateway device 150 and the movable barrier controller 102.

During a quiescent state, e.g., when the motor is not operating, the current drawn by movable barrier controller 102 is relatively small, typically on the order of tens or hundreds of milliamps. This low current is used to power low-voltage circuitry inside movable barrier controller 102 as it awaits commands to move the garage door 106. Such low-voltage circuitry may include one or more processors, electronically memories, transmitters, and/or receivers whose function is to receive wireless commands from local control devices to move the garage door 106. If a local command is received by movable barrier controller 102 to move the garage door 106, the movable barrier controller 102 energizes a motor, typically within movable barrier controller 102, in order to move the garage door 106. When energized, the motor may draw a relatively large current, typically on the order of an ampere or more. The increase in current from the quiescent state to a state where the motor is energized may be detected by the current detection device as current flows through barrier gateway device 150 as a means to determine that the garage door 106 is moving.

In one embodiment, the current detection device is placed in-line, or in series, with at least one current-carrying conductor between input power connector 210 and output power connector 212. For example, the current detection device in this case may comprise a resistor, and the current flowing through the resistor determined by processor 200 measuring a voltage across the resistor.

In another embodiment, the current detection device comprises an inductive device which is placed near or around at least one of the current-carry conductors. Such a device may comprise a wire wound one or more times around an insulating cover of one or more current-carrying conductors, a current transformer located in proximity to a current-carrying conductor, a split-ring current transformer, or any other device known in the art to sense current flowing in a conductor.

In yet another embodiment, the barrier movement detector 208 comprises a tilt sensor/transmitter combination mounted to the garage door 106 and a receiver within barrier gateway device 150. In another embodiment, the receiver comprises the communication interface 204. Tilt sensors are known in the art for detecting a change in the orientation of a sensor. For example, a tilt sensor installed onto a panel of garage door 106 may be orientated in a first plane while the garage door is in a closed position. As the garage door is opened, the orientation of the tilt sensor with respect to the ground changes and whose orientation typically changes ninety degrees after the garage door 106 is fully opened. One example of a tilt switch is at AT407 manufactured by Light Country Company, Ltd., located in the People's Republic of China. Transmission circuitry is coupled to the tilt sensor for transmission of a tilt status to a central monitoring station, such as a security panel or local area network 154 so that this information may be used to determine if the garage door 106 is in an open state, closed state, or somewhere in between. The transmission circuitry, in one embodiment, comprises Wi-Fi transmission circuitry. In another embodiment, the transmission circuitry comprises circuitry configured in accordance with the well-known Z-Wave® protocol. In one embodiment, communication interface 204 receives signals from the tilt sensor either directly or indirectly via local area network 154, security system 144, or both. As the garage door 106 is moved by movable barrier controller 102, the tilt orientation of the tilt sensor begins to change. This change is transmitted by the tilt sensor either directly to communication interface 204 or other receiver within the movable barrier gateway device 150, to the security system 144, to the local area network 154, or a combination of these. In any case, processor 200 receives notification that the tilt orientation of the tilt sensor has changed, indicating movement of the garage door 106.

Alert device 214 is coupled to processor 200 and is used to provide the moving-barrier imminent motion alert to people in the vicinity of the movable barrier system 100. The moving-barrier imminent motion alert warns people that the garage door 106 is about to move as a result of receiving a remote command to move the garage door 106. Alert device 214 may comprise amplification circuitry and a speaker for sounding an audible alert or one or more lights and amplification circuitry that causes the one or more lights to illuminate in order to provide the imminent alert to persons in the vicinity of movable barrier system 100. The moving-barrier imminent motion alert is generated by processor 200 and may persist for a time equal to the predetermined barrier movement delay time period or it may persist for a time period until movement of the garage door 106 has ceased.

Figure 3:
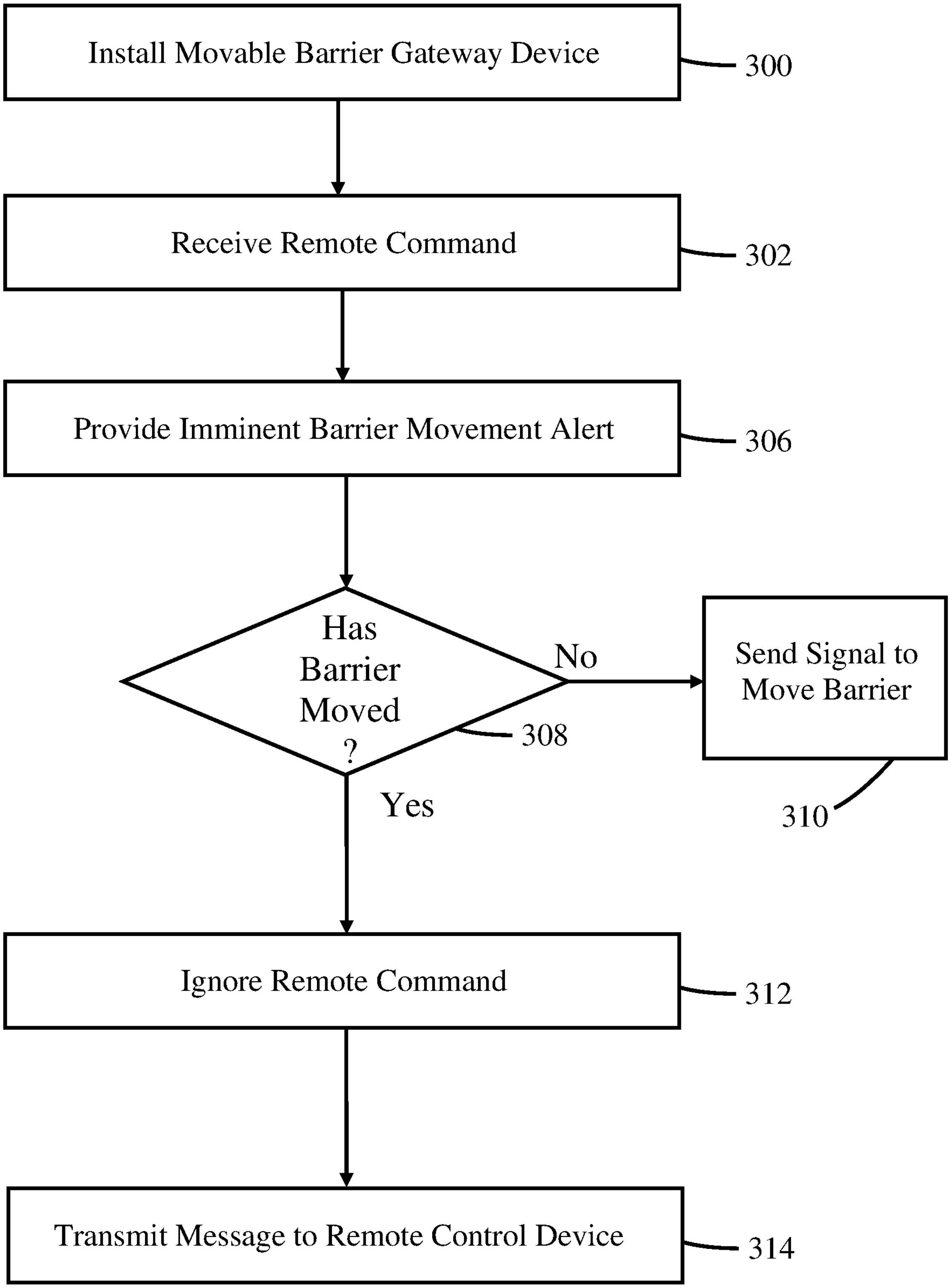
FIG. 3 is a flow diagram illustrating one embodiment of controlling a movable barrier when both local and remote commands may be used to move the movable barrier.

FIG. 3 is a flow diagram illustrating one embodiment of controlling a movable barrier when both local and remote commands may be used to move the movable barrier. The method is implemented by a processor, such as processor 200 shown in FIG. 2 located within the movable barrier gateway device 150, executing processor-executable instructions stored in a memory, such as memory 202. It should be understood that in some embodiments, not all of the steps shown in FIG. 3 are performed and that the order in which the steps are carried out may be different in other embodiments. It should be further understood that some minor method steps have been omitted for purposes of clarity.

At block 300, the movable barrier gateway device 150 is installed near movable barrier controller 102, which may comprise a controller that is not capable of being operated by remote control devices such as mobile communication device 138, networked communication device 146, security system interface 142, etc. In one embodiment, movable barrier gateway device 150 plugs directly into an existing AC electric socket in ceiling 108, and movable barrier controller 102 receives its power via the power cord 158 via a female AC power outlet on the movable barrier gateway device 150.

At block 302, a remote command is received via the communication interface 204 from a remote control device to move the garage door 106. The command may simply comprise an indication that movement is desired or, in another embodiment, comprise an indication as to a desired state of the garage door 106, e.g. to move garage door into an open position. Thus, a command to place the garage door in an open position may result in no action taken by barrier gateway device 150 and/or movable barrier controller 102 if the garage door is already in an open position. The remote command is provided to processor 200.

At block 304, as a result of receiving the remote command, processor 200 may delay moving the garage door 106 for a predetermined time period, referred to elsewhere wherein as the "predetermined barrier movement delay time period", for example 5 seconds. The predetermined barrier movement delay time period may be stored in memory 202 and may further be programmable to allow different delay periods.

At block 306, also as a result of receiving the remote command, processor 200 may provide a moving-barrier imminent motion alert or warning to people within the vicinity of the movable barrier system 100 that the garage door 106 is about to be moved. The alert may comprise an audio or visual signal, or both, via alert device 214. The duration of the alert may persist for a time equal to the predetermined barrier movement delay time period discussed at block 304, or it may persist a greater length of time, for example until cessation of movement of the garage door 106.

At block 308, processor 200 determines whether the garage door 106 has moved as a result of a local command, such as a command transmitted by a local control device such as local transmitter unit 130, wall switch 134, or optical detector 124, within the predetermined barrier movement delay time period discussed at block 304. Processor 200 may retrieve the predetermined barrier movement delay time period from memory 202 during this process. Detection of garage door movement 106 insinuates receipt of a local command generated by a local control device as well as an energization of a motor used to move the garage door 106. Processor 200 determines whether the garage door 106 has moved in conjunction with barrier movement detector 208, as described earlier, to detect conditions indicative of garage door 106 movement, such as sensing a vibration of the motor associated with movable barrier controller 102, sensing an increased current draw from the motor, sensing a change in tile orientation of a tilt sensor mounted to the garage door 106, or a combination of these methods, as discussed previously.

If the garage door 106 has not moved within the predetermined barrier movement delay time period, processing continues to block 310, where processor 200 generates and sends a signal to movable barrier controller 102 via output connection 206 and signal cable 152 to move the garage door 106 generally either to a closed position or an open position. In another embodiment, the signal sent by processor 200 simply causes movable barrier controller 102 to move the garage door 106 in a direction chosen by the movable barrier controller 102. For example, the movable barrier controller 102 may be pre-programmed to move the garage door 106 opposite to the last direction that the garage door 106 was moved. In other words, if the garage door 106 had previously been moved towards the closed position, the signal from processor 200 might cause movable barrier controller 102 to move the garage door 106 to the open position. Processor 200 may also terminate the moving-barrier imminent motion alert at this block.

If processor 200 determines that the garage door 106 has moved as a result of a local command within the predetermined barrier movement delay time period, processing continues to block 312, where processor 200 ignores the remote command to move the garage door 106. Ignoring the remote command may comprise not sending a signal to movable barrier controller 102 to move the garage door 106. It may also comprise canceling the moving-barrier imminent motion alert.

At block 314, processor 200 may send a message to a remote control device that sent the remote command to move the garage door 106, indicating that the remote command has been ignored by barrier gateway device 150 due to a local command received during the predetermined barrier movement delay time period.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention can include a processor-readable media embodying a code or processor-executable instructions to implement the methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method, conducted by a movable barrier gateway device, for moving a garage door, comprising:

receiving, by a processor coupled to a wireless communication interface, a remote command from a networked control device to move the garage door, the remote command received via the Internet and a local area network;

delaying transmission of a signal to move the garage door, by the processor, to an existing movable barrier controller coupled to the movable barrier gateway device for a predetermined time period after the remote command is received for ignoring the remote command when movement of the garage door is detected during the predetermined time period;

detecting, by the processor via a barrier movement detector, movement of the garage door within the predetermined time period; and ignoring, by the processor, the remote command in response to detecting movement of the garage door within the predetermined time period.

2. The method of claim 1, further comprising:

sending, by the processor via a signal output connection, the signal to move the garage door to the movable barrier controller if movement of the garage door is not detected within the predetermined time period.

3. The method of claim 1, further comprising:

in response to receiving the remote command, generating, by the processor, a warning signal indicative of imminent movement of the garage door; and presenting, by the processor via an alert device, the warning signal.

4. The method of claim 1, wherein detecting movement of the garage door by the barrier movement detector comprises:

determining, by the processor via the barrier movement detector, that a motor of the existing movable barrier controller used to move the garage door is active.

5. The method of claim 4, wherein determining movement of the garage door by the processor via the barrier movement detector comprises determining, by the processor, that the motor used to move the garage door is drawing electrical current.

6. The method of claim 1, wherein the barrier movement detector comprises a wireless garage door tilt sensor wirelessly coupled to the movable barrier gateway device, and detecting movement of the garage door comprises:

determining, by the processor via the wireless garage door tilt sensor, that at least a portion of the garage door has been tilted due to movement of the garage door.

7. The method of claim 1, wherein the barrier movement detector comprises a vibration sensor, and detecting movement of the garage door comprises:

determining, by the processor via the vibration sensor, that a motor of the existing movable barrier controller has been activated.

8. The method of claim 1, further comprising transmitting, by the processor via the wireless communication interface, a message to the networked control device indicating that the remote command has been ignored if movement of the garage door has been detected within the predetermined time period.

9. A non-transitory processor-readable media having processor-executable instructions stored thereon, which, when executed by a processor, causes the processor to:

receive a remote command from a networked control device to move a garage door, the remote command received via the Internet and a local area network;

delay transmission of a signal to move the garage door to an existing movable barrier controller coupled to a movable barrier gateway device for a predetermined time period after the remote command is received, the predetermined time period for ignoring the remote command when movement of the garage door is detected during the predetermined time period;

detect movement of the garage door within the predetermined time period; and ignore the remote command in response to detecting movement of the garage door within the predetermined time period.

10. The non-transitory processor-readable media of claim 9, comprising further processor-executable instructions that causes the processor to:

send the signal to move the garage door to the movable barrier controller if movement of the garage door is not detected within the predetermined time period.

11. The non-transitory processor-readable media of claim 9, comprising further processor-executable instructions that causes the processor to:

in response to receiving the remote command, generate a warning signal indicative of imminent movement of the garage door; and present the warning signal to a person in the vicinity of the garage door.

12. The non-transitory processor-readable media of claim 9, wherein the processor-executable instructions for detecting movement of the garage door comprises instructions that causes the processor to:

determine that a motor of the existing movable barrier controller used to move the garage door is active.

13. The non-transitory processor-readable media of claim 12, wherein the processor-executable instructions for detecting movement of the garage door comprises instructions that causes the processor to:

determine that the motor used to move the garage door is drawing electrical current.

14. The non-transitory processor-readable media of claim 9, comprising further processor-executable instructions that causes the processor to:

transmit a message to the networked control device indicating that the remote command has been ignored if movement of the garage door has been detected within the predetermined time period.

15. The non-transitory processor-readable media of claim 9, wherein the processor-executable instructions for detecting movement of the garage door comprises instructions that causes the processor to:

determine, via a wireless garage door tilt sensor, that at least a portion of the garage door has been tilted due to movement of the garage door.

16. The non-transitory processor-readable media of claim 9, wherein the processor-executable instructions for detecting movement of the garage door comprises instructions that causes the processor to:

determine, via a vibration sensor, that a motor of the existing movable barrier controller has been activated.

* * * * *